United States Patent [19]
Faith et al.

[11] Patent Number: 6,112,701
[45] Date of Patent: Sep. 5, 2000

[54] ANIMAL CONTAINMENT SYSTEM WITH IMPROVED WATER CONTAINER CONFIGURATION

[76] Inventors: Robert E. Faith, 9623 S. Petersham, Houston, Tex. 77031; Josh S. Meyer, 98 Dulan Dr., Stanford, Conn. 06903; Eric A. Dietrich, 1285 Hoodsmill Rd., Woodbine, Md. 21797; John Sheaffer, 1644 Greenspring Ave., Perryville, Md. 21903

[21] Appl. No.: 09/174,297

[22] Filed: Oct. 16, 1998

[51] Int. Cl.[7] .............................. A01K 5/00; A01K 7/00; A01K 39/01; A01K 39/02; A01K 39/04
[52] U.S. Cl. .......................................... 119/475; 119/417
[58] Field of Search .................................. 119/475, 454, 119/453, 452, 417

[56] References Cited

U.S. PATENT DOCUMENTS

| | | | |
|---|---|---|---|
| 2,206,383 | 7/1940 | Adams | 119/475 |
| 2,467,525 | 4/1949 | Fricke | 119/417 |
| 3,752,124 | 8/1973 | Gabriel | 119/72.5 |
| 5,669,329 | 9/1997 | Krause | 119/72.5 |
| 5,771,841 | 6/1998 | Boor | 119/452 |

OTHER PUBLICATIONS

*Lab Products, Inc., a bioMedic company*, Catalog, © Copyright Bio Medic Corporation 1997.

Primary Examiner—Peter M. Poon
Assistant Examiner—Judith A. Nelson
Attorney, Agent, or Firm—Conley, Rose & Tayon, P.C.; Jonathan M. Harris

[57] ABSTRACT

An animal containment system includes a cage with a lid and a water flask. The water flask has a generally rectangular footprint and sits on top of the cage, preferably on the lid itself. A sipper tube connected to a port on one of the sides of the water flask can be inserted through a hole in the cage lid to a height sufficient for the animals in the cage to reach up to obtain water. The lid of the cage preferably includes a recessed portion in which at least a portion of the water flask is disposed. The water flask includes a bottom surface that is sloped to facilitate emptying of the flask into the sipper tube. The water flask has a relatively low profile and thus, contributes very little to the height of the cage. Thus, existing rack designs can be used to house the same number of cage and water flask assemblies of the present invention as was possible with conventional isolation cage and water bottle designs. Further, the water flask can be replaced without having to remove the lid of the cage.

12 Claims, 5 Drawing Sheets

ANIMAL CONTAINMENT SYSTEM WITH IMPROVED WATER CONTAINER CONFIGURATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to micro isolation cages for animals. More particularly, the invention relates to a flask containing water or other liquid for feeding laboratory animals in the cage. Still more particularly, the invention relates to a water flask located substantially outside the living area of the animals and having a water level that is easily viewed.

2. Background of the Invention

Research laboratories all over the world commonly use animals to conduct medical research experiments. The use of mice, for example, as test subjects in medical research has made possible the cure of many diseases. As is true for any experiment, it is important to carefully control the variables that may effect the test results involving laboratory mice. For instance, it is necessary to ensure that each test mouse does not become contaminated by other animals or people in the laboratory. For simplicity in explaining the preferred embodiments of the invention, this disclosure focuses on mice, but the invention applies broadly to other types of animals such as rats.

To minimize the potential for contaminating the animals, as well as to insure a comfortable, safe, and clean living environment, the mice are housed in micro isolation cages. High efficiency air filters, such as High Efficiency Particulate Air (HEPA) filters, may be incorporated into a ventilation system connected to the cages to reduce the level of airborne contaminants, and reduce levels of gaseous contamination produced by animal metabolism. Such ventilation systems often are designed to provide positive air pressure to the living space of the mice relative to ambient pressure in the laboratory to help further prevent airborne contaminants from detrimentally effecting the mice.

Large research laboratories may include hundreds of cages to facilitate testing on a large number of animals. FIG. 1 shows an exemplary configuration of a rack 32 containing nine shelves of mice cages 34. Each shelf has room for seven cages and thus the rack has a total of 63 mouse cages. Many racks are double-sided providing room for 63 cages on a side, or 126 total cages in the rack. Each cage has sufficient room for as many up to 5 mice to live comfortably. Many research laboratories have many such racks containing tens or even hundreds of thousands of mice.

Part of the nutrition provided to the mice includes water. Conventional micro isolation cages include water bottles resting on a wire bar lid inside the cage top. The mice are able to lick water from a sipper tube connected to the water bottle. The water bottle is located inside the cage because that is where the mice are located. Typically, conventional water bottles are large enough to hold enough water for about one week in a cage containing 5 adult mice. Once empty, the water bottle must be refilled or replaced by a technician.

Filling or replacing the water bottles is a time consuming, expensive task. Because the water bottles are located inside the cage, the cage must be opened to access the water bottle. To minimize the potential for contamination of the mice when the lid is opened, a laboratory technician must remove the cage from the rack and place the cage in a specially designed, laminar air flow workstation when changing the water bottle. Such workstations typically include HEPA filters and other specialized components to reduce the potential for contaminating the mice. The process of removing the cage from the rack, placing it in a work station, changing the water bottle, and placing the cage back in the rack is a time consuming activity for a single cage. That amount of laboratory technician time multiplied by the large number of cages in many research laboratories results in a significant labor cost just to replace water bottles in all of the cages.

Because of the relatively large number of micro isolation cages required, the special requirements associated with each cage, the specially designed rack units required to house the cages, and the special air circulation equipment required, mice containment facilities typically result in a significantly large capital investment. Any improvements or other alterations made to the equipment should be made taking cost into account.

It thus would be desirable to reduce the labor cost. One way to reduce this cost is provide a water bottle with a larger volume permitting the bottle to contain more water than conventional water bottles. A water bottle that can hold enough water for a two week time period, for example, would be highly desirable. The time spent on replacing water bottles would be reduced significantly because the bottles could be changed less often than with smaller, conventional bottles. The time spent to change an individual bottle, however, would be the same as with conventional bottles because the cage still would have to be placed in a workstation to prevent contamination of the mice when the lid is removed to access the larger water bottle.

Simply increasing the dimension of a conventional water bottle is problematic. Because conventional water bottles are located inside the isolation cage, a larger bottle would encroach on the living area of the mice and/or the space used to provide food to the animals. Thus, a design for a larger water bottle should minimize the encroachment into the animals' living space.

Another problem with conventional water bottles is that the level of water in the bottle is often difficult to view without taking the cage out of the rack. Typically, isolation cages are located in close proximity to one another and thus it is difficult to see the water bottle in each cage without at least partially removing the cage from the rack. It thus would be desirable to provide a water bottle for a micro isolation cage that provides an indication of water level that is easy to view without having to remove the cage.

Not only can labor cost be reduced by providing a larger water supply for each cage, but labor cost can also be reduced by providing a larger food supply. With a larger supply of food, a laboratory technician is able to add more food to the cage on a less frequent basis. The solution to the problem of how to provide a larger water and food supply also should take into account the desirability of having as many cages as possible in a given rack without substantially reducing the available living space for the mice in each cage. More specifically, it would be desirable to have at least the same number of cages provided in isolation cage and rack designs but with each cage having a larger supply of water. For example, it would be desirable to still have at least 63 cages on each side in a rack as shown in the exemplary rack design of FIG. 1. Accordingly, each cage and water bottle assembly should encompass a total volumetric envelope approximately the same as that of conventional isolation cages.

Accordingly, a water bottle for a micro isolation cage that solves the problems noted above would be beneficial. It would be particularly beneficial to provide an improved water bottle arrangement that permits the use of as much existing cage and rack equipment as possible, thus minimizing the cost impact in using the improved water bottles. Further, such a bottle should provide a water level indicator that is easy to read without taking the cage out of the rack. Also, it would be desirable to change the water bottle without having to incur the labor time and cost of placing the entire cage in a work station. Despite the advantages that such a water bottle and isolation cage system would offer, to date no such system has been introduced.

BRIEF SUMMARY OF THE INVENTION

The deficiencies of the prior art described above are solved in large part by an animal containment system that includes a cage with a lid and a water flask. The water flask has a generally rectangular footprint and sits on top of the cage. Alternatively, the footprint can be any shape desired such as square, trapezoidal, or elliptical. A sipper tube connected to a port on one side of the water flask is inserted through a hole in the cage lid. The end of the sipper tube extends down into the cage to a height sufficient for the animals in the cage to reach up to obtain water. The lid of the cage preferably includes a recessed portion in which at least a portion of the water flask is disposed.

In one embodiment, the water flask includes a bottom surface that is sloped relative to the upper surface to facilitate emptying of the flask into the sipper tube. The flask preferably has a length that is at least 1.5 times its width, and preferably 1.63 times its width. If the bottom surface is sloped, the height and cross sectional area of the flask varies from one end of the flask which includes the sipper tube port to the opposite end. The height of the flask at the end associated with the port is at least 1.2 times, and preferably 1.43 times the height at the other end. The cross sectional area of one end of the flask is also at least 1.2 times, and preferably 1.43 times the cross sectional area of the opposite end of the flask. Further, the width is at least 3.5 times, and preferably 4.05 times, the maximum height of the flask and the length of the flask is at least 1.5 times, and preferably 1.63 times, the width.

With these relative dimensions, the water flask has a relatively low profile and thus, when placed on the lid contributes very little to the overall height of the containment system. Accordingly, existing rack designs can be used to house the same number of containment systems as was possible with conventional designs. Further, the water flask can be replaced without having to remove the lid of the cage. Thus, water flask replacement is possible without the use of a special workstation to prevent contamination of the animals in the cage when the lid is removed.

The various characteristics described above, as well as other features and benefits, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following drawings, in which.

DETAILED DESCRIPTION OF THE PREFERRED EMBODIMENTS

The following discussion describes a preferred embodiment of an animal containment system useful for housing mice. It should be recognized, however, that the principles discussed below are also applicable to other types of animals such as rats. Thus, although the relative and actual dimensions of the containment system described below are suitable for mice, those dimensions can readily be modified to suit the needs of any animal the containment system is to house.

Figure 1:
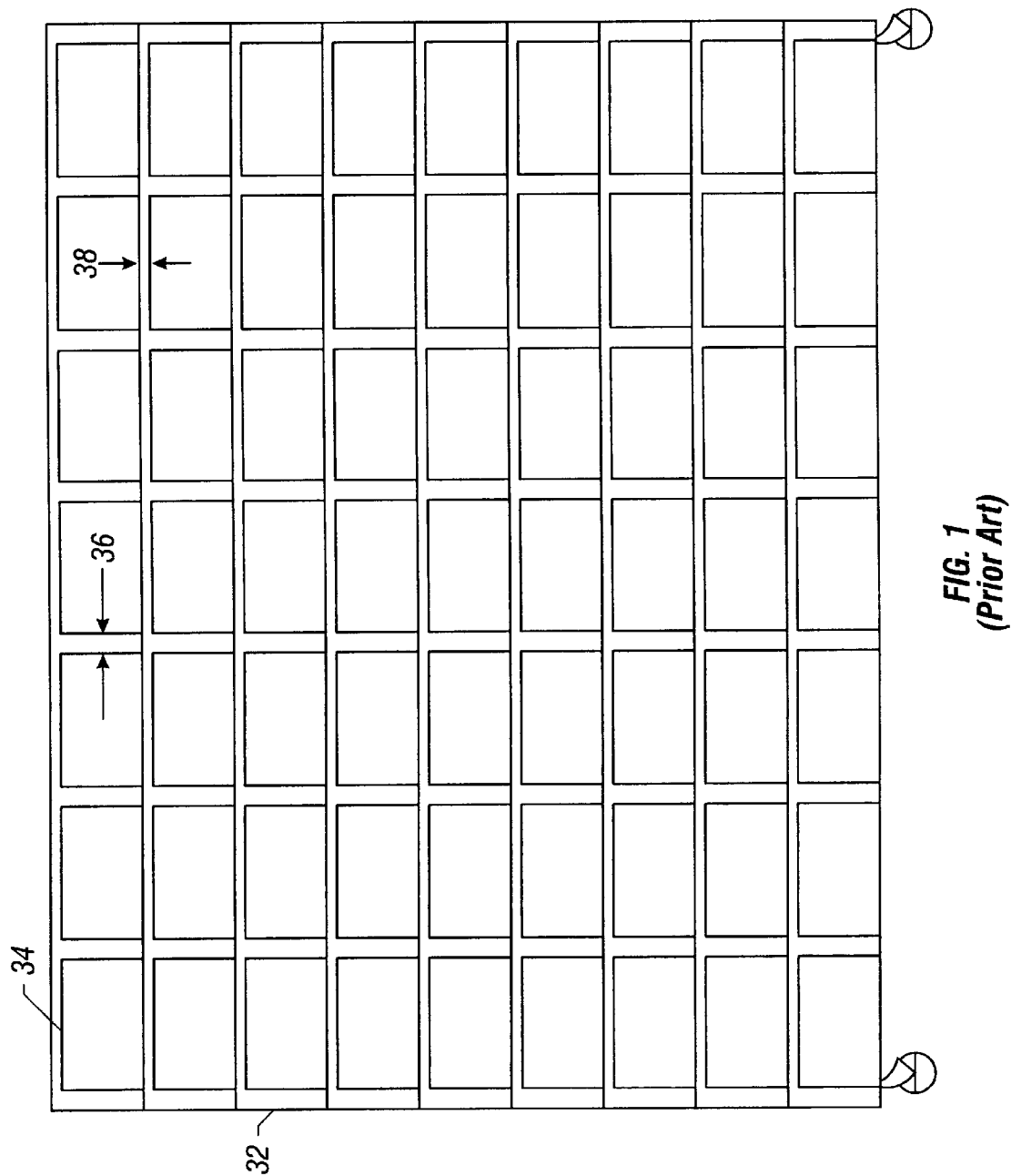
FIG. 1 is an elevation view of a prior art rack containing mouse cages.
Figure 2:
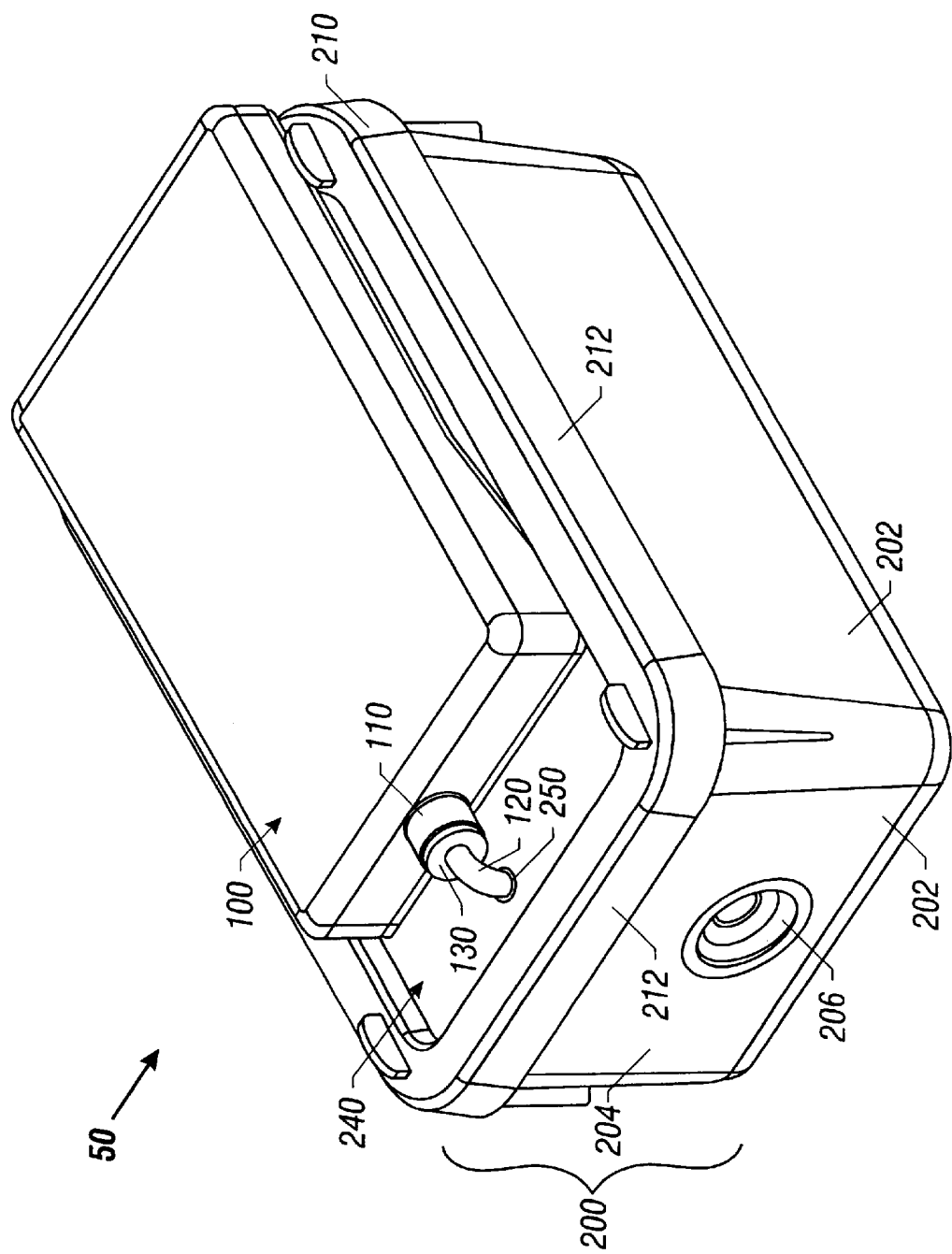
FIG. 2 is an isometric view of the animal containment system constructed in accordance with the preferred embodiment and including a cage and a water flask that sits on top of the cage.

Referring now to FIG. 2, the animal containment system 50 constructed in accordance with the preferred embodiment generally includes a water flask 100 and cage unit 200. The cage unit 200 includes a cage bottom 204 and bonnet 210 that includes a recessed portion 240 in the upper surface of the bonnet. The water flask 100 preferably sits on top of cage unit 200 with at least a portion of water flask 100 disposed within recessed portion 240 of cage bonnet 210. Water, or any other desired liquid, is contained in the flask 100, and is conducted through sipper tube 120 into the cage unit 200. The end of the sipper tube 120 mated with the water flask 100 includes a seal 130 that frictionally fits into port 110 attached to or formed as part of water flask 100. A ventilation port 206 is formed in one of the side surfaces 202 of the cage bottom 204 to provide an opening through which an air ventilation system (not shown) can be connected.

Water flask 100 rests on top of bonnet 210 with sipper tube 120 inserted through an opening (best shown in FIG. 4) in the bonnet 210. At least one benefit of water flask 100 and cage 200 should be readily apparent from the configuration depicted in FIG. 2. Because the bonnet 210 of cage 200 is disposed between the water flask 100 and cage 200, the flask can be removed without opening the bonnet 210 and risking contaminating the mice. Thus, the water flask of the preferred embodiment can be removed without the use of a workstation to prevent contamination of the mice. Moreover, the task of replacing water bottles takes significantly less time than with conventional isolation cages and water bottles included inside the cages. Other benefits of the containment system will be become apparent once the following disclosure is read.

The container 204, bonnet 210, and flask 100 preferably are constructed of polycarbonate. Polycarbonate is preferred because it is a transparent, rigid, and warm-surface material which permits ready visual inspection of the animals. Further, polycarbonate offers exceptional impact strength, resistance to high temperature, and is machine washable at a water temperature of 180° F. and a steam temperature of 250° F. Polycarbonate also can be sterilized using a wellknown autoclave machine or other suitable sterilizing device. Alternatively, any other type of material that meets some or all of the characteristics listed above may be a suitable replacement for polycarbonate. The sipper tube 120 preferably is constructed of stainless steel or another suitable, non-toxic material that mice prefer not to chew.

Figure 3:
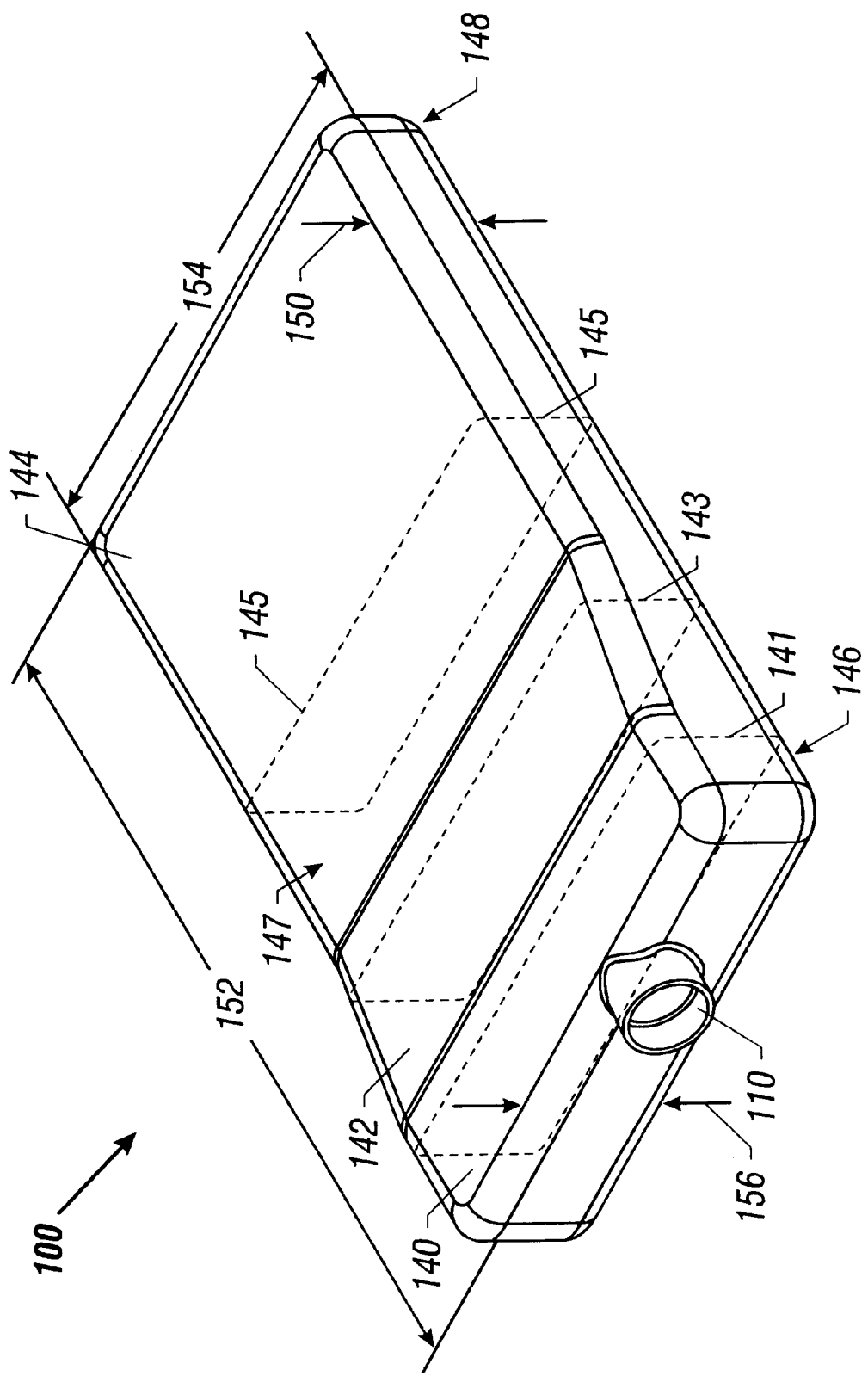
FIG. 3 is an isometric view of the bottom surface of the water flask of FIG. 2.

Referring now to FIG. 3, the bottom surface 147 of the water flask 100 preferably has a footprint that is substantially rectangular. Alternatively, the flask may have a footprint with any shape desired such as square, trapezoidal, and elliptical to name a few. If desired to facilitate the complete emptying of water from the water flask 100 through the port 110 into the sipper tube (shown in FIG. 2), the bottom surface of the water flask 100 may be incorporated with a slope as shown in FIG. 3. In accordance with the preferred embodiment, the bottom surface 147 of the water flask 100 includes three portions 140, 142, and 144. Bottom surface portion 142 functions as a sloped transition portion between bottom surface portions 140 and 144.

The end 146 of the water flask in which the port 110 is mounted preferably has a larger height 141 than the height 150 of the opposite end 148. Accordingly, the cross sectional area 141 of the flask associated with end 146 is larger than the cross sectional area 145 associated with end 148. Preferably, cross sectional area 141 is at least 1.2 times, and most preferably 1.43 times, larger than the cross sectional area 145. Because the width 154 of flask 100 is the same along length 152, these ratios of cross sectional areas 141 and 145 also apply to the ratio of heights 156 to 150. Thus, height 156 preferably is at least 1.2 times, and most preferably 1.43 times, larger than height 150. If the flask 100, however, is constructed with a footprint that does not have a uniform width, the ratios noted above with respect to the heights 156 and 150 may still be desirable even though the ratios of cross sectional areas 141 to 145 are different. Further, if the flask is constructed without a sloped bottom surface relative to the top surface, the flask may have a uniform cross sectional area throughout its length.

The length 154 of the flask 100 preferably is at least 1.5 times, and most preferably 1.63 times, larger than the width 154. Further, the width 154 preferably is at least 3.5 times, and most preferably 4.05 times, the maximum height 156 of flask 100. With these relative dimensions, the water flask 100 of the preferred embodiment generally has a low enough profile to sit on top of lid 210, and disposed at least partially in recess 240, without significantly increasing the height 250 (FIG. 5) of animal containment system 50 as compared to conventional cage designs.

In accordance with the preferred embodiment, the dimensions of the flask 100 enable the flask to have a volume substantially larger than conventional mouse cage water bottles. Preferably, length 152 of the flask is 9.5' and the width is 5.83'. Further, the height 156 of the flask at end 146 is approximately 1.44' and the height 150 at end 148 is approximately 1.01'. These dimensions provide the flask 100 with the capacity to hold approximately 26 ounces of water which generally is enough water for approximately two weeks for a cage containing five adult mice. These dimensions of course may be varied as desired without departing from the spirit and scope of the invention. For example, a rat cage preferably is larger than a mouse cage and thus, the water flask 100 constructed for a rat's cage may have the same general shape with same relative dimensions to that shown in FIGS. 2, 3, and 5 and discussed above, but may be made larger to accommodate the greater water consumption requirements of rats.

Alternatively, water flask 100 can be constructed in a variety of different configurations to facilitate emptying of water from the flask. For example, instead of a substantially rectangular footprint, the flask can have a footprint that is tapered from end 146 to end 148, such as a trapezoid as noted above. The bottom surface 147 of the water flask can be formed from two or more individual pieces of polycarbonate (three such pieces 140, 142, and 144 are shown in FIG. 3), or alternatively can be formed from a single piece of polycarbonate with smooth transitions between regions having different cross sectional areas.

Figure 4:
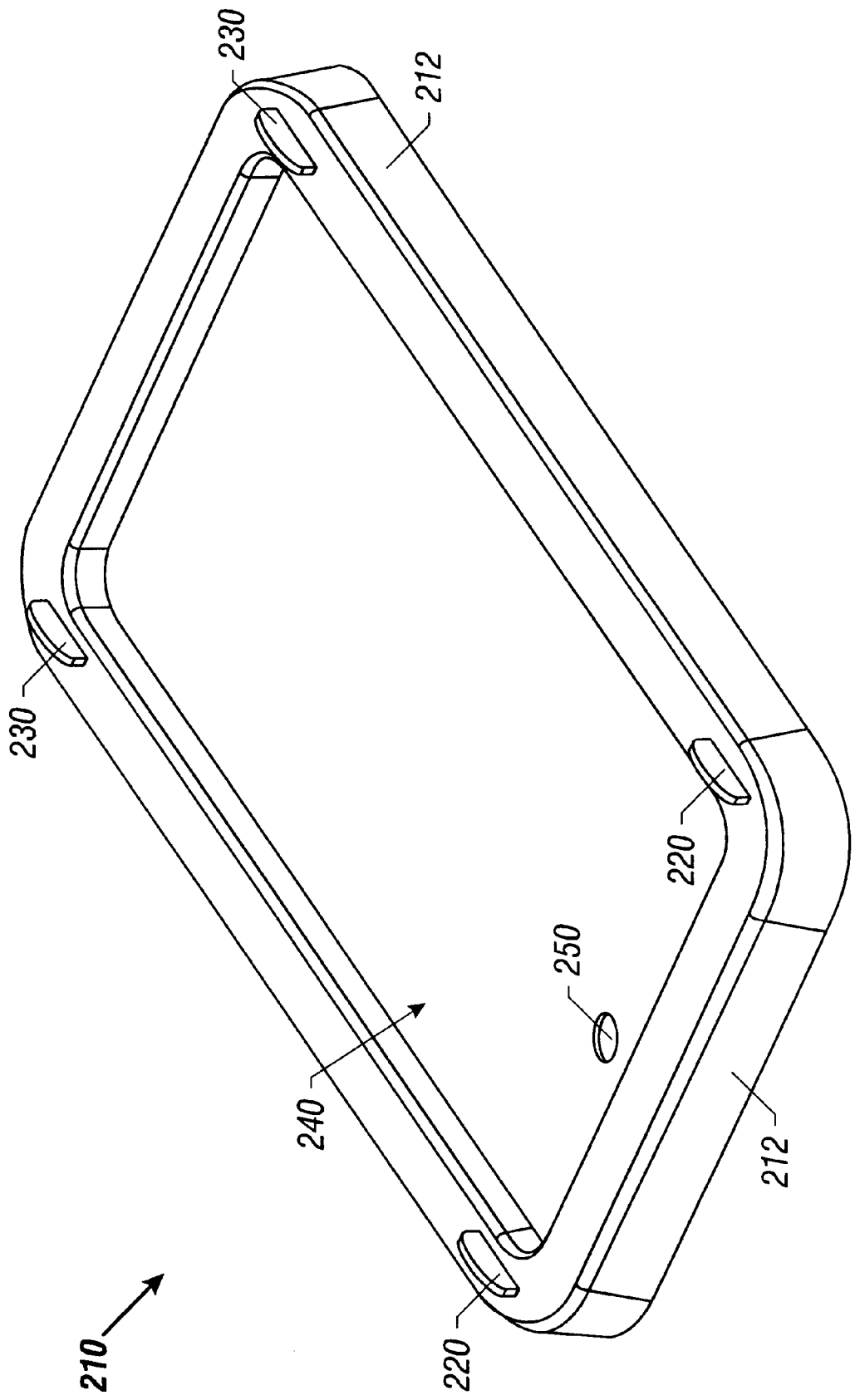
FIG. 4 is an isometric view of the lid of the cage of FIG. 2.

Referring now to FIG. 4, the bonnet 210 of cage unit 200 is shown illustrating the recessed portion 240 in greater detail. The recessed portion 240 is formed by sides 212 of bonnet 210. An opening 250 is drilled or otherwise formed in the recessed portion 240 through which the sipper tube 120 (FIG. 2) is inserted when the water flask 100 is placed on top of the bonnet 210. Accordingly, the opening 250 is at least wide enough to accommodate sipper tube 120. The bonnet 210 preferably also includes four fins 220 and 230. In accordance with the preferred embodiment, fins 230 function to prevent the water flask 100 from moving laterally once placed on top of bonnet 210. All four fins 220 and 230 also function to facilitate stacking of the bonnets 210 for storage.

Figure 5:
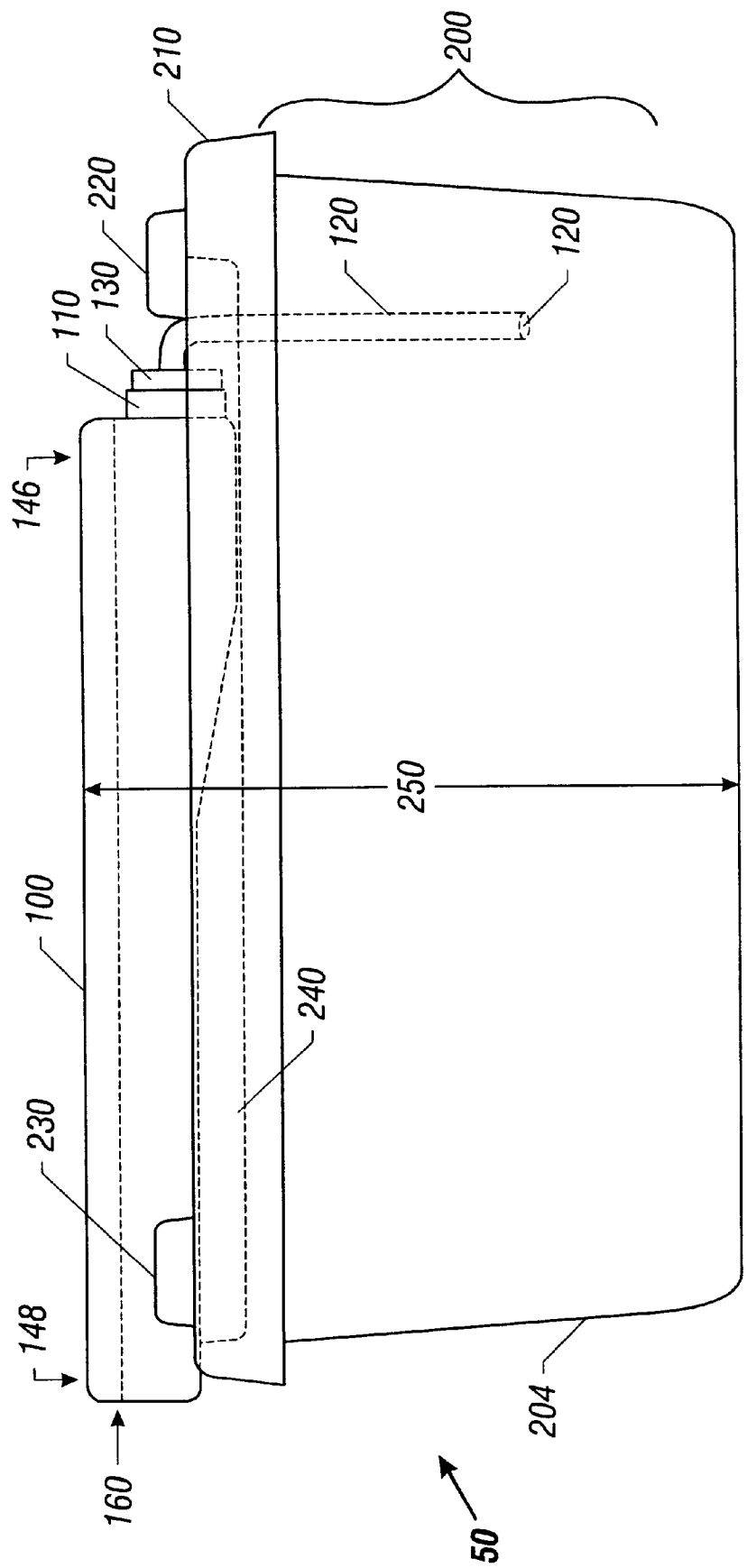
FIG. 5 is an elevation view showing interior structures in phantom.

Referring now to FIG. 5, the cage unit 200 is shown in a side view with the water flask 100 positioned on top of bonnet 210. As shown, end 146 of the flask 100 is partially disposed within recess 240. The sipper tube 120 extends down into the container 204 to a height sufficient for the animal to reach up to the tube end 121 to lick water from the tube. The diameter of the sipper tube 120 preferably has a diameter of approximately ¼ inch outer diameter As such, the surface tension of the water in the sipper tube is sufficiently high to prevent the water from running out of the tube 120 and into the cage 204.

FIG. 5 also illustrates another benefit of flask 100. The level 160 of water in the flask can be viewed easily without having to remove the cage from the rack. In accordance with the preferred embodiment, the containment system 50 is slid into a rack along the direction of the arrow associated with reference numeral 160. Once inserted, end 148 of the flask faces the outside of the rack. Accordingly, the water level 160 can be viewed easily through the transparent material comprising flask 100.

The size and shape of the water flask 100 and cage unit 200 is such that the animal containment system 50 preferably has approximately the same volumetric envelope as conventional isolation cages with water bottles contained within the cage. Thus, existing rack designs can accommodate approximately the same number of containment systems 50 as with previous cage and water bottle designs. This benefit is realized by constructing a water flask that is substantially flat compared to its width and length and positioning the flask on top of the cage. Providing a recessed area in the lid of the cage helps hold the flask in place as well as further reduces the height of the overall system. Further, by locating the flask 100 outside the cage 200, more room is available inside the cage for the animals' living space. Alternatively, the volume previously occupied by conventional water bottles located inside the cage can now be used for additional food, thereby increasing the supply of food in the cage.

Thus, the cage bottom 204 and bonnet 210 provide a means for housing an animal. The water flask 100 is a means for containing water to be delivered to the animal. The sipper tube is a means for delivering water to the animals. There are numerous equivalents to this structure. For example, the cage bottom 204 may include a non-removable top on which the water flask 100 may sit. An access door can be included in one or more of the sides of the cage to access the cage interior. Further, the shape and relative dimensions of the flask 10 can be varied from that shown in the drawings and described above. The water flask, however, should have a relatively low profile to achieve the benefit of having a larger volume flask that results in a containment system having approximately the same volumetric envelope as conventional cages.

The preferred embodiment of the invention described above provides numerous benefits over conventional animal cages which include water bottles inside the isolation cages. Some of these benefits are:

(1) Larger water flask requires less frequent replacement;

(2) The level of water in the water flask is easier to view than with conventional water bottles;

(3) Locating the water flask outside the cage permits replacement of the flask without opening the cage, and thus the cage need not be placed in a work station to prevent the animals from becoming contaminated, thereby reducing the time required to care for the animals;

(4) Locating the water flask outside the cage allows more room for food inside the cage; and (5) The total volume occupied by the preferred containment system is approximately the same as that of conventional isolation cages, and thus existing racks can be used with the same number of cages per rack The above discussion is meant to be illustrative of the principles of the present invention. However, numerous variations and modifications will become apparent to those skilled in the art once the above disclosure is fully appreciated. It is intended that the following claims be interpreted to embrace all such variations and modifications. Also, the claimed invention should not be construed as limited to laboratory animal cages, but applies to non-laboratory animal cages as well.

What is claimed is:

1. An animal containment system, comprising:

a cage unit;

a flask to provide liquid to animals in said cage unit; and a substantially flat bonnet to cover said cage unit, said bonnet having a surface area and being disposed between said flask and said cage unit, and said substantially flat bonnet defining a recessed area that spans more than half of the surface area of the bonnet;

wherein at least a portion of said flask is disposed within said recessed area.

2. The animal containment system of claim 1 further including a sipper tube attachable to said flask and insertable through the bonnet into the cage unit.

3. The animal containment system of claim 1 wherein said flask has a substantially rectangular footprint.

4. The animal containment system of claim 3 wherein the flask has a length and a width, and the length is at least approximately 1.5 times greater than the width.

5. The animal containment system of claim 3 wherein the flask has a length and a width, and the length is approximately 1.63 times greater than the width.

6. The animal containment system of claim 3 wherein the flask has a height and a width, and the width is at least 3.5 times greater than the height.

7. The animal containment system of claim 3 wherein the flask has a height and a width and the width is approximately 4.05 times greater than the height.

8. The animal containment system of claim 3 wherein the flask has first and second ends along the longest dimension of the flask, the flask has a first cross sectional area at the first end and a second cross sectional area at the second end, and the first cross sectional area is larger than the second cross sectional area.

9. The animal containment system of claim 8 wherein said flask includes a port at the first end and a sipper tube attached to said port and extending through a hole formed in said bonnet.

10. The animal containment system of claim 9 wherein the first cross sectional area is at least approximately 1.2 times larger than the second cross sectional area.

11. The animal containment system of claim 9 wherein the first cross sectional area is approximately 1.43 times larger than the second cross sectional area.

12. The animal containment system of claim 2 wherein said flask includes a bottom surface that sits on said bonnet and said bottom surface includes a slope portion between the first and second ends to encourage liquid to empty into said sipper tube.

* * * * *

UNITED STATES PATENT AND TRADEMARK OFFICE
CERTIFICATE OF CORRECTION

PATENT NO. : 6,112,701
DATED : September 5, 2000
INVENTOR(S) : Robert E. Faith, Josh S. Meyer, Eric A. Dietrich and John Sheaffer It is certified that error appears in the above-identified patent and that said Letters Patent is hereby corrected as shown below:

<u>Column 5</u>,
Line 51, after flask is, change " 9.5' " to read -- 9.5" --;
Line 52, after width is, change " 5.83' " to read -- 5.83" --;
Line 53, after approximately, change " 1.44' " to read -- 1.44" --; and
Line 54, after approximately, change " 1.01' " to read -- 1.01" --.

Signed and Sealed this

Twelfth Day of March, 2002

Attest:

*Attesting Officer*

JAMES E. ROGAN
*Director of the United States Patent and Trademark Office*